Sept. 14, 1954   H. H. KING   2,688,822
PLANT PROTECTOR
Filed Sept. 4, 1953   2 Sheets-Sheet 1

Inventor
HENRY H. KING
By *[signature]*
Attorney

Sept. 14, 1954  H. H. KING  2,688,822
PLANT PROTECTOR
Filed Sept. 4, 1953  2 Sheets-Sheet 2
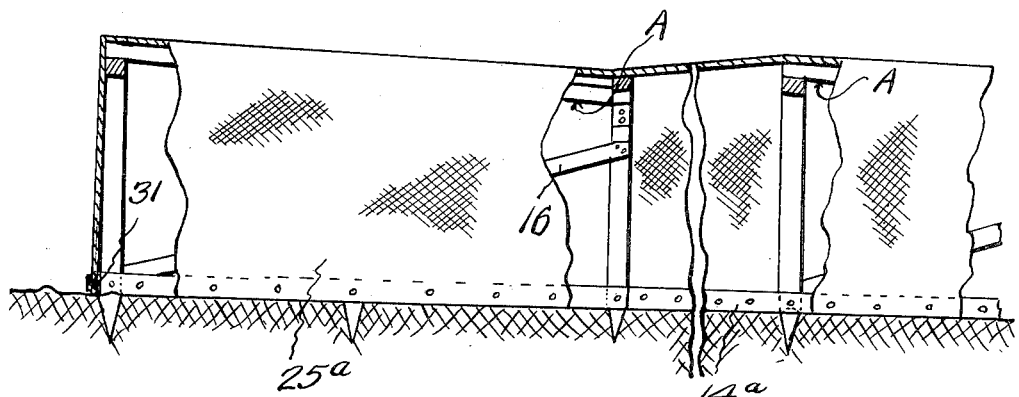
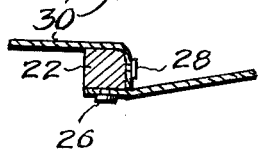
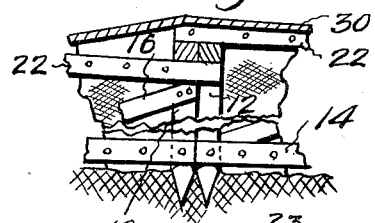
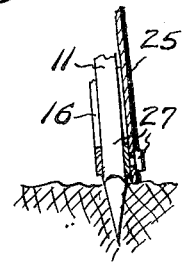
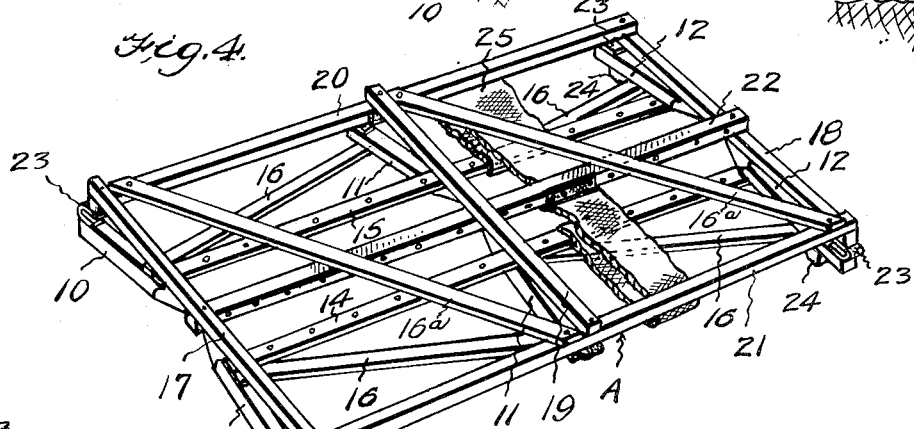
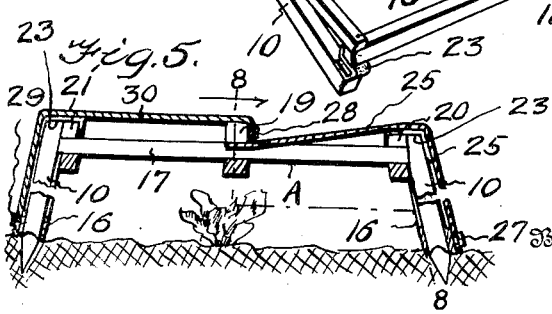
Inventor
HENRY H. KING Patented Sept. 14, 1954

2,688,822

UNITED STATES PATENT OFFICE 2,688,822

PLANT PROTECTOR

Henry H. King, Washington, D. C.

Application September 4, 1953, Serial No. 378,458

3 Claims. (Cl. 47—28)

This invention relates to plant protectors, and has for one of its objects the production of a simple and efficient protector frame which is so constructed as to permit two or more sections of the plant protector to be interlocked together to provide a continuous frame-work, upon which suitable plant-protecting fabric may be placed.

Another object of this invention is the production of a simple and efficient plant protector frame which may be conveniently folded to facilitate storage or transportation of the collapsed or folded frames so that they may be accommodated in a minimum amount of space.

A further object of this invention is the production of a plant protector which is so constructed as to efficiently support preferably a relatively heavy protector material, such as a coarse unbleached fabric known as gunny cloth upon one side of the frame of the protector which may be exposed to the north and also support a lighter porous fabric such as tobacco fabric upon the opposite side of the frame which may be exposed to the south, thereby protecting the plants which are shielded under the protector from frost and cool dews on the north side of the frame, while permitting moisture and sunshine to enter the frame through the lighter fabric on the south side of the frame.

Other objects and advantages of this invention will appear throughout the following specification and claims.

In the drawings:

Figure 3 is a side elevational view of a series of protector frames illustrating a further use of the frames wherein the frames may be spaced apart and the same covered by the plant-protecting covering which covering spans the distance between the spaced frames;

Figure 4 is a perspective view of one of the frames in a folded position;

Figure 5 is a vertical sectional view taken on line 5—5 of Figure 2;

Figure 6 is an enlarged detailed sectional view taken on line 6—6 of Figure 1;

Figure 7 is a vertical sectional view taken on line 7—7 of Figure 2;

Figure 8 is a vertical sectional view taken on line 8—8 of Figure 5;

Figure 1:
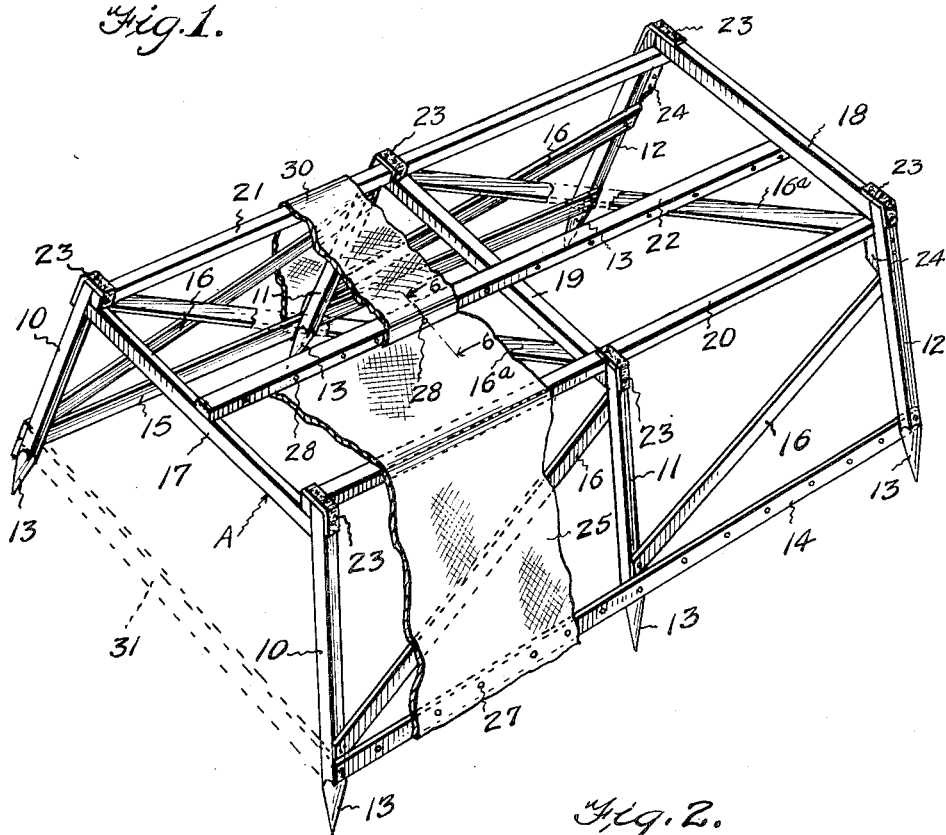
Figure 1 is a perspective view of one of the plant protector frames, a portion of the plant-protecting fabric being shown thereon.
Figure 2:
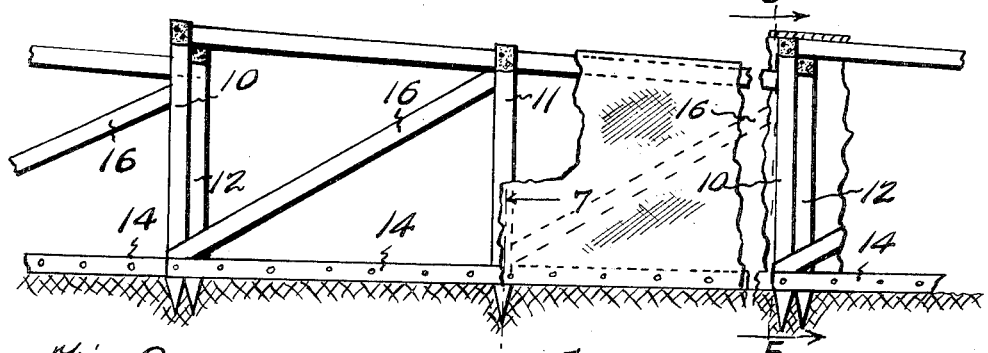
Figure 2 is a side elevational view illustrating a series of frames interlocked together, the plant-protecting fabric being partly broken away.

By referring to the drawings, it will be seen that A designates the plant-protector frame which comprises a plurality of supporting legs 10 located upon each side of the frame A, the legs upon one side converging upwardly toward the legs on the opposite side of the frame, as shown in Figure 1. Each leg is preferably tapered or pointed, as at 13, at its lower end to facilitate the anchoring of the legs in position. The legs 10, 11, and 12 upon one side of the frame are connected near their lower ends by means of a connecting strip 14 and this strip 14 is secured to the outer faces of the legs 10 and 11 and to the inner face of the leg 12, as shown in Figure 1. A connecting strip 15 connects the legs 10, 11 and 12 on the opposite side of the frame A and is secured to the outer faces of the legs 10 and 11 and to the inner face of the leg 12, for the purpose hereinafter described. Suitable diagonal side braces 16 are secured to the spaced side legs, as shown in Figures 1, 2, 3 and 4.

Each frame A is provided with transverse end top rails 17 and 18, and an intermediate transverse center rail 19. Side top rails 20 and 21 extend longitudinally of the frame A and are secured to the top faces of the end top rail 17 and the transverse center rail 19. These rails 20 and 21 are anchored at their opposite ends to the under face of the top end rail 18, as shown in Figure 1. A longitudinal central rail 22 is secured at one end to the upper face of the end top rail 17 and near its center to the upper face of the transverse center rail 19. The opposite end of the longitudinal central rail 22 is secured to the under face of the top end rail 18. The legs 10 and 11 upon each side of the frame A are hinged to the side rails 20 and 21, as shown in Figure 1, and the legs 12 are hinged to the ends of the top end rail 18. Fabric hinges 23 are preferably employed to prevent tearing the fabric which is adapted to stretch over the frame or frames A. Bracing blocks 24 are carried by the legs 12 upon the inner faces and are adapted to abut against the under faces of the ends of the side rails 20 and 21 which rails are secured to the under face of the top end rail 18. These blocks 24 will limit the inward swing of the legs 12 and brace these legs 12 in proper alignment with the legs 10 and 11. Diagonal braces 16ª are carried by the top panel of the frame.

Figure 9:
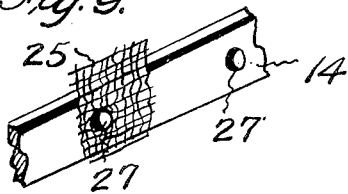
Figure 9 is a detail perspective view illustrating the manner in which the fabric is secured or fastened to the plant-protector frame.

A relatively heavy strip of fabric 25 such as gunny cloth is secured to the connecting strip 14 after the legs of the frame A are secured firmly in the ground. This strip 25 is then passed upwardly of the sides of the frame A and extended over the rail 20 and a portion of the top and it is then secured to the under side of the rail 22. I preferably employ headed tacks 26 which are secured to the under face of the rail 22 and headed tacks 27 which are secured to the outer side face of the connecting strip 14, over which tacks the mesh of the fabric is hooked in a manner shown in Figure 9 to secure the fabric 25 in place. Tacks 28 are secured to the side face of the rail 22 which faces toward the fabric 25, as shown in Figures 1 and 6, and a strip of relatively thin porous fabric 30, preferably tobacco cloth is secured at one edge to these tacks 28. This strip of fabric 30 is then extended over the side rail 21 and down the opposite side of the frame A, as shown in Figures 1 and 5, the opposite edge of the strip of fabric 30 being anchored over the tacks 29 carried by the connecting strip 14. The fabric may be extended down over the ends of the frame A if it is desired to do so, whether one or more frames are used, such for instance in the manner as shown in Figure 3. In this event a connecting end strip 31 shown in Figure 5 and in dotted lines in Figure 1, may be used to anchor the lower edge of the fabric which is extended over the end of the frame.

The frames A may be used as a series, and because of the special structure illustrated and described, wherein the longitudinal rails and strips overlap the top end rail 17 and legs 10 and extend under the top end rail 18, the top end rail 17 and legs 10 of one frame A may overlap and interlock with the top end rail 18 and legs 12 of the adjoining frame A. In this way an efficient interlocking means is provided for tying a series of frames A together so as to prevent accidental displacement of the frames and the accidental uncovering of the plants shielded thereby. This structure will provide a rigid bracing as well as connecting means for the frames when they are secured together. It is preferable to eliminate sharp corners wherever possible to avoid tearing the fabric used upon the frame or frames.

As shown in Figure 3, the frames A may be longitudinally spaced so as to extend over a row of a maximum length, and when so assembled the ends of the frames A are preferably connected by connecting strips 14ᵃ similar to the strips 14 and the lower edges of the strip of fabric 25ᵃ is secured to this strip 14ᵃ and the strips 14 of the frames A by means of hooking the fabric over suitable headed tacks similar to the tacks 27. The fabric 25ᵃ is extended over the frames A as previously described and spans the distance between the ends of the frames A. The end of the fabric 25ᵃ may be anchored to the tacks carried by the strip 31 which strip extends transversely across the end legs of the end frame A, as shown in Figure 3. It should be understood that the frames A may be grouped in any number or arranged in any desired manner without departing from the spirit of the invention to cover a desired area which is to be protected.

As shown in Figure 4, the frame A may be collapsed by folding the side panels carrying the legs backwardly over the top panel of the frame in a manner whereby the fabric will be folded inside between the top panel and the side panels, and by reversing the frame so that the legs may lie under the frame, these frames may be easily stored and will accommodate the frames to a minimum amount of space when not in use. It will be noted that each frame A comprises a top panel including the rails 17, 18 and 19, and the rails 20, 21 and 22, and two side panels including the legs 10, 11 and 12 and the strips 14 and braces 16. These side panels are hingedly secured to the top panel by means of the hinges 23 to facilitate folding.

From the foregoing description it will be seen that a simple and efficient interlocking means is provided for tying a plurality of frames together, and that the frames are of an openwork nature which may be covered in a manner to shield plants and the like from killing frost by placing the relatively heavy protecting fabric on the side of the frame which faces north, and placing the relatively thin fabric on the side which faces south so that the plants may get the benefit of the sun through the thin fabric.

It should be noted that two or more frames may be arranged in spaced-apart relation so as to have the fabric reach across a number of frames in such a manner as to cover all of the space in and between the different frames. The fabric may cover all of the frames in a unit and may overlap other connecting fabric so as to cover any size field. The frames will support the fabric over and around the frames, short of the lower edges of the frames, so that the frames may be forced into the ground and around growing plants of any kind. One or more frames may be used separately or together in a unit with the connecting fabric running the length and spanning the space in between the frames. The frames, when not in use, may be removed, folded and stacked, and then replaced in position after plowing or spraying or the frames may be folded and stacked for storage or transportation to a desired location.

It should be understood that certain detail changes in mechanical structure may be provided without departing from the spirit of the invention so long as such changes fall within the scope of the appended claims.

Having described the invention, what I claim as new is:

1. A plant protecting means of the class described comprising a plurality of frames, each frame having a transverse top rail at its front end and a transverse top rail at its rear end, means connecting the transverse top rails defining a top panel, the front rail depending below said panel and the rear rail extending above said panel, depending side panels secured to the sides of said top panel, each side panel comprising a front and rear leg, a connecting strip securing the front and rear legs of said panel together, the connecting strip engaging the outer face of the front leg and the inner face of the rear leg thereby supporting the front leg inwardly of the side panel and the rear leg outwardly of the side panel, the front top rail and the front legs of one frame fitting in front of the rear top rail and rear legs of the adjoining frame in overlapping and interlocking relation for tying the frames together in longitudinal alignment and in detachable relation, and a covering for said frames.

2. A plant protecting means for the class described comprising a plurality of frames, each frame having a transverse top rail at its front end and a transverse top rail at its rear end, means connecting the transverse top rails defining a top panel, the front rail depending below said panel and the rear rail extending above said panel, depending side panels secured to the sides of said top panel, each side panel comprising a front and rear leg, a connecting strip securing the front and rear legs of said panel together, the connecting strip engaging the outer face of the front leg and the inner face of the rear leg thereby supporting the front leg inwardly of the side panel and the rear leg outwardly of the side panel, the front top rail and the front legs of one frame fitting in front of the rear top rail and rear legs of the adjoining frame in overlapping and interlocking relation for tying the frames together in longitudinal alignment and in detachable relation, a covering for said frames, and means hingedly connecting the side panels to the side edges of said top panel for outward swinging movement to permit folding, and anchoring means at the ends of said legs for holding the frame in a set-up position.

3. A plant protecting means of the class described comprising a plurality of frames, each frame having a transverse top rail at its front end and a transverse top rail at its rear end, means connecting the transverse top rails defining a top panel, the front rail depending below said panel and the rear rail extending above said panel, depending side panels secured to the sides of said top panel, each side panel comprising a front and rear leg, a connecting strip securing the front and rear legs of said panel together, the connecting strip engaging the outer face of the front leg and the inner face of the rear leg thereby supporting the front leg inwardly of the side panel and the rear leg outwardly of the side panel, the front top rail and the front legs of one frame fitting in front of the rear top rail and rear legs of the adjoining frame in overlapping and interlocking relation for tying the frames together in longitudinal alignment and in detachable relation, a covering for said frames, means hingedly connecting the side panels to the side edges of said top panel for outward swinging movement to permit folding, anchoring means at the ends of said legs for holding the frame in a set-up position, the upper end of each leg having an abutment engaging the ends of the adjacent top rail to limit the inward swing of the legs and side panels in a direction under the top rails and top panel.

References Cited in the file of this patent

UNITED STATES PATENTS

| Number | Name | Date |
|---|---|---|
| 541,695 | Smith | June 25, 1895 |
| 893,441 | Caruthers | July 14, 1908 |
| 1,003,370 | Priest | Sept. 12, 1911 |
| 1,172,983 | Green | Feb. 22, 1916 |
| 1,432,339 | Jones | Oct. 17, 1922 |

FOREIGN PATENTS

| Number | Country | Date |
|---|---|---|
| 150,936 | Great Britain | Sept. 16, 1920 |